United States Patent Office 3,496,357
Patented Feb. 17, 1970

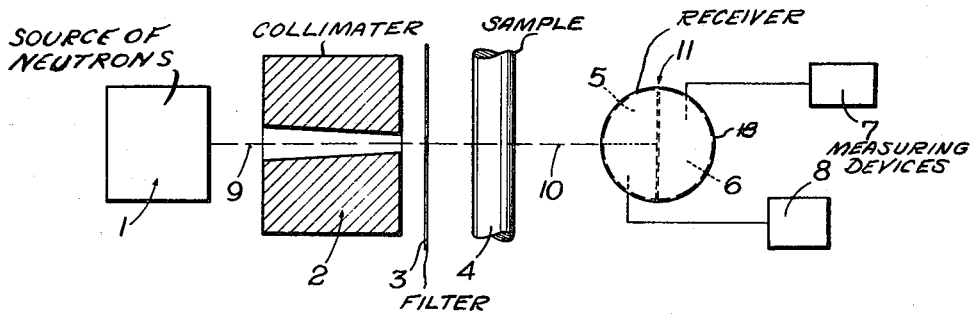
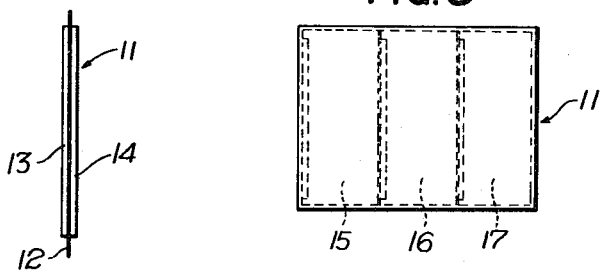
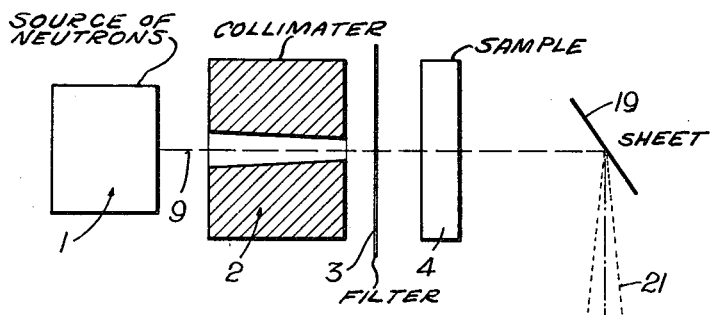
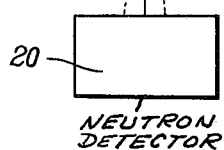

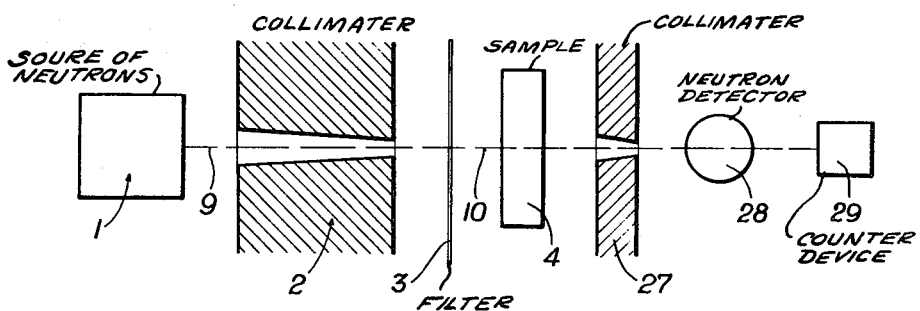
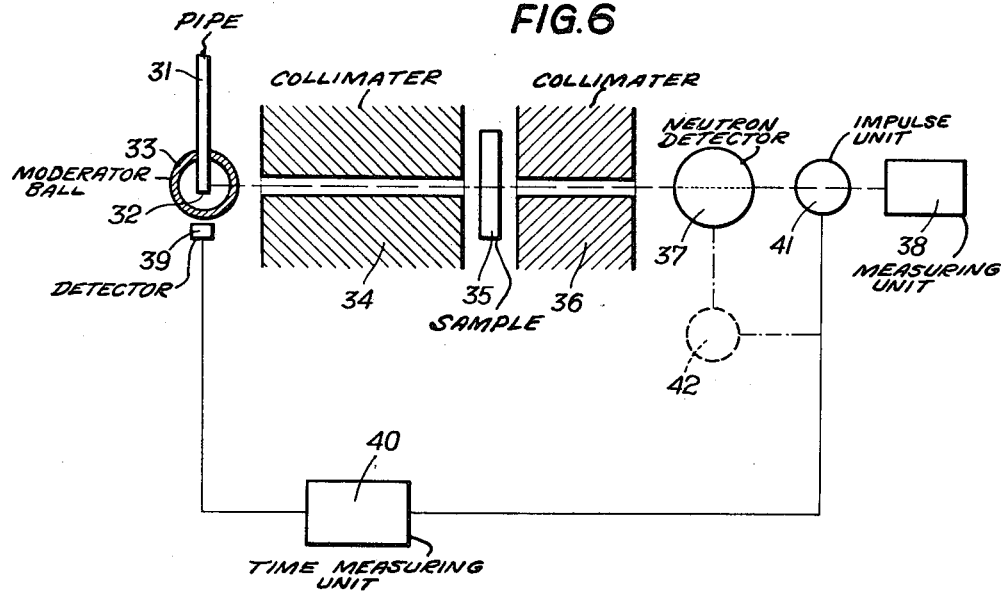

3,496,357
METHOD AND APPARATUS FOR THE EXAMINATION OF SAMPLES OF NUCLEAR FUEL OR WHOLE FUEL ELEMENTS WITHOUT DESTRUCTION THEREOF
Peter Weinzierl and Franz Putz, Vienna, Austria, assignors to Osterreichische Studiengesellschaft für Atomenergie Ges. m.b.H., Vienna, Austria, a corporation of Austria
Filed Nov. 9, 1965, Ser. No. 507,007
Claims priority, application Austria, Nov. 9, 1964, A 9,464/64; Aug. 27, 1965, A 7,916/65
Int. Cl. G01t *3/00, 1/16;* H01j *39/00*
U.S. Cl. 250—83.1         12 Claims

ABSTRACT OF THE DISCLOSURE

A method for detecting and measuring the quantity present in a composition of a nuclei having at least one resonance absorption cross-section comprising the steps of providing a source of neutrons having an energy spectrum extending across the energy band of the at least one resonance absorption cross-section of the nuclei to be measured, measuring the energy spectrum in a detector, impinging the neutrons upon a composition containing the nuclei to be measured, measuring the energy spectrum of the neutron radiation emanating from the composition and comparing it with the first-mentioned measured energy spectrum to detect and provide a measurement of the quantity of the nuclei present in the composition.

---

This invention concerns a method and apparatus for the determination of the proportion of fissionable materials in samples of core-fuel without destruction thereof.

Fuel elements for core reactors contain, before use in a nuclear reactor, a certain concentration of at least one fissionable isotope under the action of thermal and epithermal neutrons. The amount of this fissionable isotope decreases during the period of use in the reactor. On the other hand, by the neutron radiaiton, other fissionable isotopes are formed from materials which are frequently contained in the fuel elements. Thus for example the isotope PU239 is formed over intermediate stages from the Uranium isotope 238, which is fissionable and can be used as core fuel.

The fissionable isotope U-233 is likewise formed over intermediate stages from the Thorium isotope Th232. It is frequently necessary to know the proportion of the newly formed isotopes and the decrease of the original isotopes. Hitherto the determination of the proportion of a given fissionable material in a sample of the core fuel could only be carried out by means of radio chemistry. For this however, the sample had to be taken out of the reactor and destroyed. It is obvious that this is time consuming and costly. Without destruction, only the total content of fissionable material could be measured.

It is an object of the present invention to direct the radiation from the sample to one or more receivers which are sensitive to the resonance energies of the materials to be detected, and to determine the ratio of the proportions of the fissionable materials from a comparison of the appearances on the receivers. At the same time it is advantageous to provide the receiver with the same fissionable material the proportion of which contained in the sample is to be measured. With samples of greater thickness or having a higher content of a certain fissionable isotope it is possible to reduce the sensitivity of the measuring device by a coarser collimation of the neutron beam. In this way even thicker layers can be measured.

It is another object of the present invention to provide a method and an apparatus therefor for detecting and measuring the quantity present in a composition of a nuclei having at least one resonance absorption cross-section comprising the steps of providing a source of neutrons having an energy spectrum extending across the energy band of the at least one resonance absorption cross-section of the nuclei to be measured, measuring the energy spectrum in a detector, impinging the neutrons upon a composition containing the nuclei to be measured, measuring the energy spectrum of the neutron radiation emanating from the composition and comparing it with the first-mentioned measured energy spectrum to detect and provide a measurement of the quantity of the nuclei present in the composition.

With the above and other objects in view which will become apparent in the following detailed description, the present invention will be clearly understood in connection with the accompanying drawings, in which:

FIGURE 1 shows schematically the device of the present invention;

FIGS. 2 and 3 show special embodiments of a receiver for the device; and

FIGS. 4, 5, and 6 show further embodiments of the devices.

Referring now to the drawings, and more particularly to FIG. 1, a beam of neutrons is given off from a source of neutrons 1 and the energies of the neutrons emitted are continuously distributed in a given energy range. A core reactor is, for example, suitable as the source of the neutrons; the neutrons could however, also be produced by an accelerator plant or by a radioactive source of neutrons. The neutron beam 9 is collimated by means of a collimator 2. As all the thermal neutrons have practically the same effect on all fissionable isotopes, they must be removed as substantially as possible from the neutron beam. A filter 3, which may for example consist of a sheet of cadmium, is therefore provided behind the collimator 2.

The neutron beam then passes through a sample of nuclear fuel 4. The sample 4 may be either one nuclear fuel element or only a part of the same.

As is known, neutrons can be captured by a nuclear core. There are, for certain nuclear reactions in the core, defined energy values, in which the capture cross-section is exceptionally high; these energy values are the resonance energies for the particular neutron capture and the probability of capture is very high thereat. The resonance energies have specific characteristic values for each of the isotopes.

The present invention utilizes the effect explained above in that the radiation passing out of the fuel sample 4 is fed into a receiver 11 which is provided with a fissionable material which is the same as the fissionable material to be measured. As, in the radiation beam 10 passing out of the sample 4, the proportion of neutron energies corresponding to the resonances are reduced in intensity due to absorption and scattering in the fuel sample 4, and a smaller measuring effect occurs in the receiver 11 because the receiver is particularly sensitive to these resonance energies. The effect occurring in the receiver due to fissioning of the material serving as the neutron sensitive substances can then be measured in various known ways. For example, the ionization can be fed by means of an amplifying system to measuring devices 7 or 8.

If it is desired to establish the proportions of two isotopes simultaneously, for example the content of U235 and Pu239, then these two materials must be provided at separate areas on the receiver. The secondary appearances in these two areas are then determined separately and finally compared with one another. Examples will be explained in the following.

In FIG. 1 a sheet is used as the receiver which is enclosed in the container 18. As FIG. 2 shows, on one side of a sheet 12, a layer 13 of for example U235 is located and on the opposite side, a layer 14 of for example Pu239.

Upon impact of the neutron irradiation 10, the U235 fission resonance energies will cause the U235 to fission which in turn causes an ionization in the chamber 5, which can be measured in a known manner by means of the measuring device 8. Those neutron energies which are characteristic for fissioning of Pu239 will on the other hand cause fission in the Pu239 layer 14 on the other side of the sheet 12, which causes ionization in the chamber 6. This ionization is measured in a known manner in the measuring appliance 7.

Referring now again to the drawings, and more particularly to FIG. 3 different embodiment of the receiver 11 is shown. In this case the receiver is divided into three areas 15, 16 and 17. In this manner the proportions of three different isotopes can be simultaneously established, if one uses for each chamber such isotope as the sensitive layer.

A further embodiment consists in an arrangement where the layers 13 and 14 of FIG. 2 are made relatively thick so that their thickness is considerably greater than the full width of the fission fragments. Then by the decelleration of these fragments, heating of the layers 13 and 14 occurs which can be measured in a known way. The amount of heat built up in the layers is then a measure of the number of fissions which have taken place.

A third embodiment consists in an arrangement in which, instead of a heat build up, the increased radioactivity of the fission fragments are determined by known methods for measuring radioactivity.

The present invention is in general not only useful for nuclear fuel measurements, but for measurements of all materials whose neutron cross-section includes pronounced resonances. For purpose of the claims absorption cross-section is defined to include capture, fission and scattering cross-sections.

Referring now again to the drawings, and more particularly to FIG. 4, a fourth embodiment of the receiver is shown. The sheet 19 contains fissionable material and serves for the scattering of the neutron energies corresponding to the resonances of this material. The scattered and fission neutrons 21 are then registered in one or more neutron detector devices 20 of normal construction. The advantage of such an arrangement lies in that the actual measuring devices 20 are not subjected to the direct radiation of the neutron source, nor of the fuel sample. In order to ascertain the content of for example two isotopes in the sample 4, the sheet 19 may be composed of two materials alternately and the corresponding effect on the two types of scattering sheets is established in the detector 20.

In the embodiment according to FIG. 5, a source of neutrons 1 for example a reactor is provided. The energyspectrum of the source of neutrons must be held within the energy range of about 0.05 to 100 ev. A collimator 2 collimates the neutron beam 9 from the source. The sample 4 to be measured is provided beyond the collimator 2. Thus it is possible to utilize the transmission of this material as to neutrons for the establishment of its content with respect to a given isotope or component of its composition. The isotope or component which is to be measured must have an exceptionally high capability of absorbing and scattering neutrons at a given neutron energy.

In order to raise the sensitivity of the measuring process sufficiently, an energy bank filtered out of the continuously divided energy spectrum of the neutrol radiation beam 9 by means of a filter 3, so that the neutron radiation 10 leaving the filter 3 is exclusively or at least very substantially composed of neutrons of the resonance energy which is very preferentially absorbed and scattered by the isotope to be measured in the sample 4. A collimator 27 is arranged behind the sample 4 which block's the neutrons, scattered in the sample 4 or in the filter 3, from a detector 28 located therebehind. Consequently only such neutrons enter the detector 28 which are within the characteristic energy range for the isotope or component to be measured, and which can still penetrate the sample 4. A counter device 29 makes possible the registration of the neutrons taken up by the detector 28 in a given period of time.

The measuring is carried out in the following manner with the device described. First, for a given interval of time the number of neutrons measured in the detector 28 is registered, the sample 4 not being located in the path of the radiation. The sample 4 is then, as shown in FIG. 5 brought into the radiation beam, and the count of the neutrons measured in the detector 28 in the same interval of time is determined. The transmission of the sample is established, from the ratio of the number of neutrons registered with and without the sample 4, for that neutron energy for which the isotope or component to be measured has a particularly high scattering and absorption resonance or capability.

For purposes of the claim relating to this embodiment "scattering" is defined to mean neutrons enamating from the composition out of the path of the source of neutrons, and includes neutrons produced from fissions as well as ordinary scattering.

The measurement of Pu239 in a nuclear core fuel element is to be considered as an example and a particularly important use of the arrangement described. For this case the prominent absorption and scattering characteristics of plutonium for a neutron energy of 0.296 ev. can be utilized. A filter may be advantageously composed from the materials samarium and indium for the neutron resonance energy of plutonium 239. A combination of these two materials in a suitable thickness, is placed into a path of neutron radiation of continuous energy distribution, and allows neutrons with energy range within the vicinity of the above-mentioned and preferred plutonium resonance to pass therethrough.

The transmission established by means of the above described measuring of the sample 4 is on the one hand determined by the strong absorption and scattering capability of the isotope or component measure in the selected neutron energy range, and on the other hand however, the other isotope or components of the sample 4, which could very greatly dominate in amount, and which also contribute to the absorption and scattering of neutrons in the sample. In order to ascertain this contribution to the transmission measured, a further process of measurement is necessary. For this purpose an arrangement is used which is similar to the arrangement of FIG. 5 except for the following points:

(1) The source 1 of the neutrons must be constructed so that the neutrons entering the collimator 2 predominantly correspond to a thermal energy distribution of neutrons, that is in a typical manner having a maximum intensity at 0.025 ev. at room temperature, and (2) The filter 3 is omitted.

The measurement is otherwise carried out exactly as the measurement described above, that is, the transmission of the sample for thermal neutrons is determined. This transmission value of the sample with thermal energy makes it possible to correct the transmission measurement with the characteristic neutron energy of the material component to be determined such that only an exact determination of the transmission in relation to the material component is possible.

Referring now again to the drawings, and more particularly to FIG. 6, a modified embodiment of an arrangement which can be employed is illustrated.

An evacuated pipe 31 of a particle accelerator through which protons or deuterons for example, are shot onto a target 32 is provided. This system represents one part of a known plant for the production of neutron radiation. At the same time it is possible, by means of a periodic, intermittent irradiation of the target 32, to produce also a periodic pulsed neutron beam.

These high energy neutrons are slowed down in a hollow moderator ball 33 which is disposed around the target. The hollow moderator ball advantageously consists of a stationary body which contains a high percentage of hydrogen. The neutrons passing out of the moderator ball are collimated by means of a collimator 34 and impinge on a sample 35. This is identical with the sample 4 of FIG. 5 and contains the isotope or material component to be determined. A collimator 36 blocks the neutrons scattered in the sample 35, away from detector 37 so that only those neutrons reach the detector which have passed through the sample 35. A measuring unit 38 counts the neutrons registered in the detector 37.

The fact that the neutrons on the target 32 are formed in short intervals of time (e.g., a typical length of impulse is 1 microsecond, with the time between impulses, 1 millisecond), and that the slowing-down process in the moderator 33 also requires a period of time comparable with 1 microsecond, causes the neutron impulses to leave the moderator ball with a broad energy distribution. The time which the neutrons take in passing from the moderator ball 32 to the detector 37, is a measurement of their speed and energy. The measuring of the transmission of the sample 35 can be carried out in an advantageous manner as follows:

A time-start-impulse is either taken electrically from the accelerator system itself or is produced in a neutron detector system 39 in the immediate vicinity of the moderator ball.

A time measuring device, for example an electronic clock 40, is switched in with this time marking. This causes the measuring signals of the detector 37 to only reach the register unit 38 in given intervals of time from the time measuring signals of the detector 39. The unit 41 can be constructed for example in the form of an electronic impulse gate in a known manner. It is also possible to activate the detector 37 by electrical means within the desired intervals of time only. In this case the unit 41 could be omitted and instead, a unit 42 which, provides the detector with current would be controlled. The choice of the time interval between the start-impulse of the unit 39 and the actual registration of the neutrons in the detector 37 determines the range of energy of the neutrons which actually are registered. Advantageously two energy intervals of the neutrons will be chosen by adjustment of the time measuring unit 40.

(1) Neutrons of the energy which are prominently scattered and absorbed by the isotope or material component to be determined in the sample 35.

(2) Neutrons of thermal energy.

The measurement can now be carried out in the following manner. First, the neutron count having the selected resonance energy established in the detector 37 within a given time, is measured without the sample 35 being present. At the same time thet measurement, controlled by the time unit 40 takes place for each neutron impulse in a short interval of time, corresponding to the desired neutron energy, after the appearance of the neutrons in the source 33. Hereafter the sample 35 is brought into the neutron irradiation beam and the number of the neutrons is registered for the same time. That is, the transmission of the sample 35 for neutrons of the selected resonance energy is determined just as in the first arrangement.

The measurement for thermal neutrons, which is accomplished in the same way as in the arrangement first described, is necessary for the purpose of correction, and is carried out by means of another adjustment of the time measuring unit 40. This now corresponds to the time of flight of thermal neutrons from the source 33 to the detector 37. In this way the arrangement shown in FIG. 6 allows the measurement of the transmission of the sample 35 for the characteristic resonance energy and the measurement of the transmission for the thermal neutron energy just as in the arrangement described in FIG. 5. The following details should be noted with regard to the arrangement of FIG. 6.

The time device 40 must permit the measuring process in the detector 37 or the opening of the impulse gate 41 within a finite interval of time. This can be in the case of the resonance neutrons, typically about 10 microseconds, and in the case of the thermal neutrons, about 100 microseconds, if the total flight path between the moderator 33 and the detector 37 lies between a ½ m. and 1 m. Furthermore it is naturally possible to feed into the detector and register unit both the resonance neutrons and somewhat later the thermal neutrons for each neutron impulse leaving the moderator ball 33. In this case a switch over must be carried out between the two register units which replace the unit 38.

The measuring arrangement described with reference to FIG. 6, which establishes the energy of the neutrons by means of a measurement of the time of flight can in principle be used too, with a continuous source of neutrons, as for example, a reactor. In this case, the neutron generator 31, with target 32 and moderator ball 33 would be replaced by a continuous source of neutrons (for example, a nuclear reactor) and a neutron radiation interruptor which can be constructed in a known manner. Besides this, the arrangement described with reference to FIG. 6 can be used.

The invention can be used in particular, with irradiated or non-irradiated core fuel elements or parts thereof, to establish the content of fissionable materials therein individually. Thus U235, U233 and Pu239, for example, as the most important fissionable materials each have prominent resonances, and by selection of the neutron energy value for the measurement, the content of the isotopes can be established simultaneously. At the same time no destruction of the sample takes place.

While we have disclosed several embodiments of the present invention, it is to be understood that these embodiments are given by example only and not in a limiting sense, the scope of the present invention being determined by the objects and the claims.

What we claim is:
1. A method for detecting and measuring the quantity present in a composition of a nuclei having at least one resonance absorption cross-section comprising the steps of:
providing a source of neutrons having an energy spectrum extending across the energy band of the at least one resonance absorption cross-section of the nuclei to be measured,
measuring said energy spectrum in a detector,
impinging said neutrons upon a composition containing said nuclei to be measured, and
measuring the energy spectrum of the neutron radiation emanating from said composition and comparing it with the first-mentioned measured energy spectrum to detect and provide a measurement of the quantity of said nuclei present in said composition.
2. The method, as set forth in claim 1, wherein:
said source of neutrons includes thermal neutrons.
3. The method, as set forth in claim 1, wherein:
said step of providing a source of neutrons having an energy spectrum extending across the energy band of the at least one resonance absorption cross-section of the nuclei to be measured comprises the steps of:
providing a pulsed beam of neutrons of various energies including said energy band, and
selecting those neutrons of said energy band by detecting neutrons at a time after said pulsed beam begins, corresponding with the time it would take for neutrons within said energy band to travel between said source and said detector.
4. The method, as set forth in claim 1, wherein:
said nuclei comprises at least two differefent fissionable nuclei both of which are detected and measured as to the ratio of each, and each having at least one resonance absorption cross-section, said source of neutrons having an energy spectrum extending across the energy bands of said at least one resonance absorption cross-sections of each of said fissionable nuclei, and comparing the measured energy spectrum of the neutrons emanating from said composition at said absorption cross-sections of each of said fissionable nuclei to provide a measure of the proportions of said fissionable nuclei material present, respectively.

5. The method, as set forth in claim 1, wherein:

said energy spectrum of said source of neutrons is a continuous energy spectrum exclusive of thermal neutrons.

6. The method, as set forth in claim 1, wherein:

said measuring of the energy spectrum of the neutron radiation emanating from said composition is accomplished by measuring the ionization in a detector caused by fissions in a receiver, 7. The method, as set forth in claim 1, wherein:

said measuring of the energy spectrum of the neutron radiation emanating from said composition is accomplished by measuring the heat built up in a reeciver due to fissions.

8. The method, as set forth in claim 1, wherein:

said measuring of the energy spectrum of the neutron radiation emanating from said composition includes the step of measuring neutrons scattered by impingement on said composition, and said measuring being accomplished in a scattering path out of line with the impingement path of said source of neutrons.

9. The method, as set forth in claim 1, further comprising the step of:

disposing a sample of said nuclei in said detector and directing said neutron radiation emanating from said composition thereat, and said measuring of the energy spectrum of the neutron radiation emanating from said composition is accomplished by measuring the neutron radiation emanating from said sample of said nuclei disposed in said detector.

10. A device for detecting and measuring the quantity present in a composition of a nuclei having at least one resonance absorption cross-section, comprising:

a source of neutrons having an energy spectrum extending across the energy band of said at least one resonance absorption cross-section, a sample of said composition spaced apart from said source, a collimator means for directing said neutrons onto said sample, a detector means spaced from said sample for detecting the neutrons emanating from said sample, and said detector including a sheet containing a sample of said nuclei.

11. The device, as set forth in claim 10, further for measuring the proportion of another nuclei in said composition wherein:

said sample of said nuclei is disposed on one side of said sheet, and a sample of said another nuclei is disposed on the other side of said sheet.

12. The device, as set forth in claim 10, further comprising:

means for adjusting the collimation of said neutrons to thereby change the sensitivity of the device according to the thickness of said sample of said composition and/or of the quantity of said nuclei to be detected in said sample of said composition.

References Cited

UNITED STATES PATENTS

| | | | |
|---|---|---|---|
| 2,845,544 | 7/1958 | Seaborg et al. | 250—83.1 X |
| 3,018,374 | 1/1962 | Pritchett | 250—71.5 |
| 3,050,627 | 8/1962 | Miller | 250—83.3 |
| 3,141,092 | 7/1964 | Weinberg | 250—83.1 X |

RALPH G. NILSON, Primary Examiner

A. B. CROFT, Assistant Examiner

U.S. Cl. X.R.

250—83.3